US008111827B2

(12) United States Patent
Yamamoto et al.

(10) Patent No.: US 8,111,827 B2
(45) Date of Patent: Feb. 7, 2012

(54) CRYPTOGRAPHIC PROCESSING APPARATUS AND CRYPTOGRAPHIC PROCESSING METHOD

(75) Inventors: Dai Yamamoto, Kawasaki (JP); Kouichi Itoh, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 84 days.

(21) Appl. No.: 12/612,290

(22) Filed: Nov. 4, 2009

(65) Prior Publication Data
US 2010/0183143 A1 Jul. 22, 2010

(30) Foreign Application Priority Data

Jan. 16, 2009 (JP) ................. 2009-007249

(51) Int. Cl.
*H04K 1/00* (2006.01)
*H04K 1/04* (2006.01)
*H04K 1/06* (2006.01)
*H04L 9/00* (2006.01)
*H04L 9/28* (2006.01)
(52) U.S. Cl. ................. 380/28; 380/29; 380/37
(58) Field of Classification Search .............. None
See application file for complete search history.

(56) References Cited

U.S. PATENT DOCUMENTS
2002/0159599 A1* 10/2002 Matsui et al. ............ 380/263

FOREIGN PATENT DOCUMENTS
JP 4128395 7/2008

OTHER PUBLICATIONS

Satoh, et al., "Hardware-Focused Performance Comparison for the Standard Block Ciphers AES, Camellia, and Triple-DES," 2003, ISC 2003, LNCS 2851, pp. 252-266.*
Yalla, et al., "Compact FPGA Implementation of Camellia," Sep. 29, 2009, FPL 2009.*
"Cipher Technology Specification: MISTY1," Mitsubishi Electric Corporation, Sep. 27, 2001 (updated May 13, 2002), 18 pp. (including translation).
"A Very Compact Hardware Implementation of the MISTY1 Block Cipher," Dai Yamamoto et al., International Association for Cryptologic Research, CHES 2002, LNCS 5154, pp. 315-330, 2008.
"Small and High-Speed Hardware Architectures for the 3GPP Standard Cipher KASUMI," Akashi Satoh et al., Information Security Conference 2002, LNCS 2433, pp. 48-62, 2002.

* cited by examiner

*Primary Examiner* — Jung Kim
*Assistant Examiner* — Robert Leung
(74) *Attorney, Agent, or Firm* — Staas & Halsey LLP

(57) ABSTRACT

A cryptographic processing apparatus for performing arithmetic operation on an FL function and an $FL^{-1}$ function in a cryptographic process includes a first arithmetic gate is configured to receive a first input bit string and a first extended key bit string, a first XOR gate configured to receive an output of the first arithmetic gate and a second input bit string, a second arithmetic gate configured to receive an output of the first XOR gate and a second extended key bit string, a second XOR gate configured to receive an output of the second arithmetic gate and the first input bit string, a third arithmetic gate configured to receive an output of the second XOR gate and the first extended key bit string, and a third XOR gate configured to receive an output of the third arithmetic gate and an output of the first XOR gate.

18 Claims, 9 Drawing Sheets

|  | FIRST CONVENTIONAL EXAMPLE | SECOND CONVENTIONAL EXAMPLE | FIRST AND FIFTH EXAMPLES | SECOND AND SIXTH EXAMPLES | THIRD AND SEVENTH EXAMPLES | FOURTH EXAMPLE |
|---|---|---|---|---|---|---|
| #1-bit MUX | 32 | 32 | 32 | 32 | 0 | 0 |
| #1-bit AND/OR | 64 | 32 | 48 | 48 | 80 | 80 |
| #1-bit XOR | 64 | 32 | 48 | 48 | 48 | 48 |
| Gate Count [gate] | 336 | 224 | 280 | 280 | 200 | 200 |

FIG. 9

|  | AND/OR (=2d) | XOR (=3d) | 2-1MUX (=3d) | DELAY |
|---|---|---|---|---|
| FIRST CONVENTIONAL EXAMPLE | 2 | 2 | 1 | 13d |
| SECOND CONVENTIONAL EXAMPLE | 2 | 2 | 2 | 16d |
| FIRST AND FIFTH EXAMPLES | 3 | 3 | 2 | 21d |
| SECOND AND SIXTH EXAMPLES | 3 | 3 | 2 | 21d |
| THIRD AND SEVENTH EXAMPLES | 5 | 3 | 0 | 19d |
| FOURTH EXAMPLE | 3 | 3 | 0 | 15d |

CRYPTOGRAPHIC PROCESSING APPARATUS AND CRYPTOGRAPHIC PROCESSING METHOD

CROSS-REFERENCE TO RELATED APPLICATIONS

This application is based upon and claims the benefit of priority from the prior Japanese Patent Application No. 2009-7249 filed on Jan. 16, 2009, the entire contents of which are incorporated herein by reference.

FIELD

The embodiment(s) described herein relate to a cryptographic processing apparatus and a cryptographic processing method.

BACKGROUND

Various cipher algorithms are utilized as fundamental technologies of security systems. Generally, cipher algorithms are classified into two groups, namely, public key cryptosystems and common key cryptosystems. The public key cryptosystems use different keys for encryption and decryption. The public key cryptosystems keep a key for decrypting ciphertext called a secret key as secret information only for a receiver, instead of making a key for encryption called a public key publicly available, to thereby ensure high security. The common key cryptosystems, on the other hand, use the same key for encryption and decryption called a common key. The common key cryptosystems keep a common key as information unknown to any third party other than the sender and receiver to thereby ensure high security.

The cipher algorithms of the common key cryptosystems have the advantages of high processing speed and compact packaging over the cipher algorithms of the public key cryptosystems. Therefore, the encryption function is added to compact devices such as mobile phones or integrated-circuit (IC) cards using the cipher algorithms of the common key cryptosystems. Furthermore, due to the high processing speed and real-time encryption/decryption of information, the cipher algorithms of the common key cryptosystems are also used for broadcasting or information communication in communication fields.

The cipher algorithms of the common key cryptosystems are classified into two types, namely, stream ciphers and block ciphers. Now, the block ciphers are widely used in terms of security. The block ciphers divide plaintext into blocks each having a certain bit length, and encrypt the plaintext block by block. The bit length of each block which is the unit of encryption is called "block length".

There are many block ciphers of the common key cryptosystems with various types of block sizes such as 64-bit, 128-bit and others. Typical cipher algorithms include DES (Data Encryption Standard), AES (Advanced Encryption Standard), SC2000, MISTY1, MISTY2, KASUMI, and CAMELLIA. Such cipher algorithms of the common key cryptosystems are implemented by software or hardware.

One of the cipher algorithms of the common key cryptosystems, MISTY1, will now be described. MISTY1 is described in, for example, Specification of MISTY1 (<http://www.cryptrec.go.jp/cryptrec_03_spec_cypherlist_files/PDF/05_02jspec.pdf>). MISTY1 is a cipher algorithm with a common key size of 128 bits and a block length of 64 bits. That is, MISTY1 generates 64-bit ciphertext from 64-bit plaintext using a 128-bit common key. In the following, a description will be given of a round processing part of MISTY1.

Figure 10A:
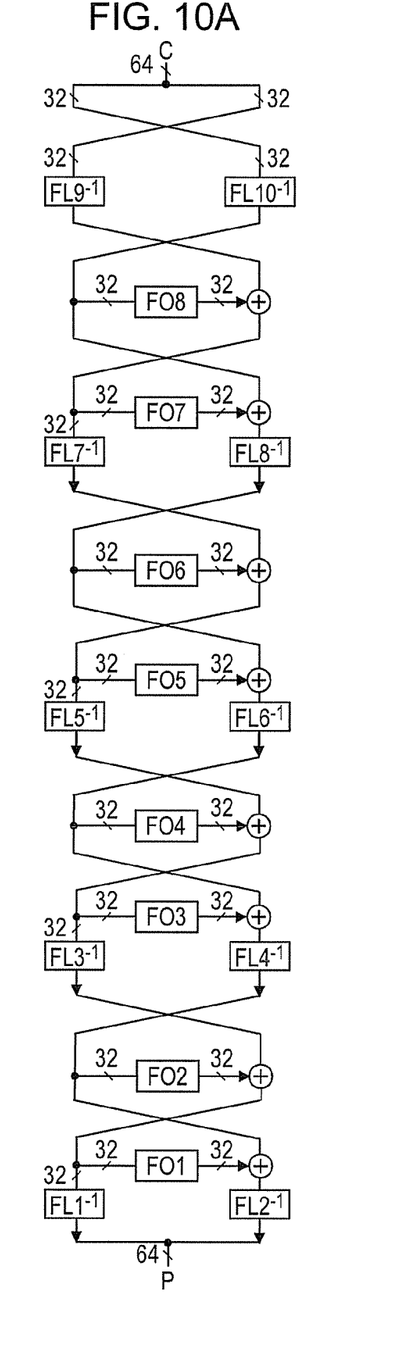
FIG. 10A is a circuit diagram illustrating an example configuration of a round processing part for performing decryption according to MISTY1.
Figure 10B:
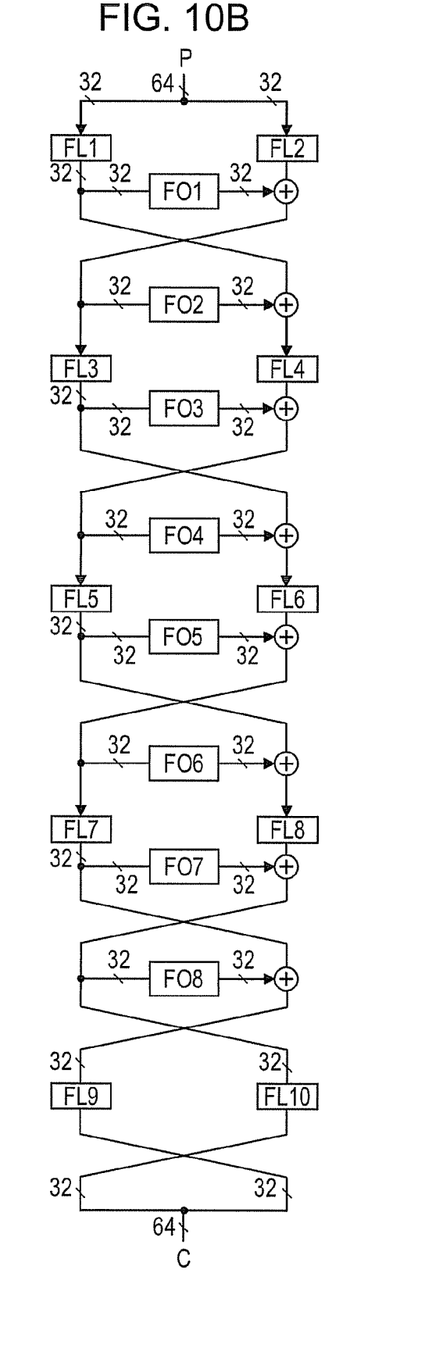
FIG. 10B is a circuit diagram illustrating an example configuration of a round processing part for performing encryption according to MISTY1.

FIGS. 10A and 10B are circuit diagrams illustrating an example configuration of a MISTY1 round processing part. FIG. 10A illustrates a round processing part for use in the decryption process. FIG. 10B illustrates a round processing part for use in the encryption process.

The round processing part of MISTY1 illustrated in FIGS. 10A and 10B performs processing where the number of rounds n is 8. In Specification of MISTY1 mentioned above, 8 rounds are recommended. The round processing part of MISTY1 has a Feistel structure with eight FO functions FO1, FO2, FO3, FO4, FO5, FO6, FO7, and FO8 and ten FL functions FL1, FL2, FL3, FL4, FL5, FL6, FL7, FL8, FL9, and FL10 or ten $FL^{-1}$ functions $FL1^{-1}$, $FL2^{-1}$, $FL3^{-1}$, $FL4^{-1}$, $FL5^{-1}$, $FL6^{-1}$, $FL7^{-1}$, $FL8^{-1}$, $FL9^{-1}$, and $FL10^{-1}$. In the encryption process of MISTY1, 64-bit plaintext P is input and 64-bit ciphertext C is output. In the decryption process, 64-bit ciphertext C is input and 64-bit plaintext P is output.

In the following, a description will be given of the FL functions and the $FL^{-1}$ functions.

Figure 11A:
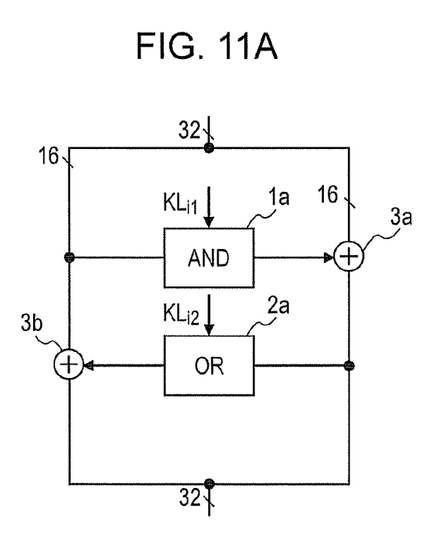
FIG. 11A is a circuit diagram illustrating an example configuration of an FL function.
Figure 11B:
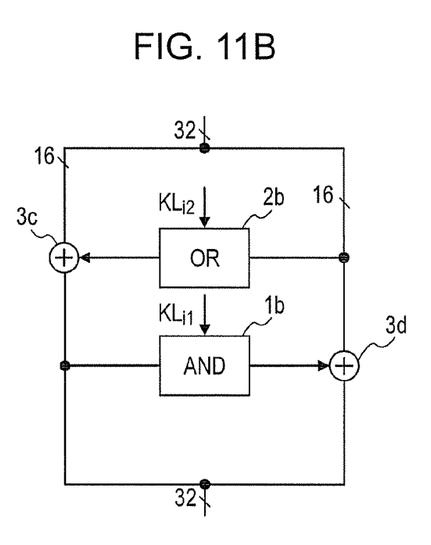
FIG. 11B is a circuit diagram illustrating an example configuration of an FL⁻¹ function.

FIG. 11A is a circuit diagram illustrating an example configuration of an FL function. FIG. 11B is a circuit diagram illustrating an example configuration of an $FL^{-1}$ function. The FL function includes an AND gate 1a in the first stage and an OR gate 2a in the second stage. Conversely to the FL function, the $FL^{-1}$ function includes an OR gate 2b in the first stage and an AND gate 1b in the second stage.

32-bit input data to the FL function and the $FL^{-1}$ function is divided into two data segments of 16 bits each, and each data segment is transformed using an XOR gate, an AND gate, and an OR gate. In FIGS. 11A and 11B, $KL_{ij}$ ($1 \leq i \leq 8$, $1 \leq j \leq 2$) represents 16-bit data at the j-th position from the left of $KL_i$, where $KL_i$ denotes an extended key. In MISTY1, extended-key processing is performed to generate a 256-bit extended key $KL_i$ from a 128-bit secret key K. The details of the generation of an extended key are described in Specification of MISTY1 mentioned above.

In the FL function, the bit string of the upper 16 bits of the 32-bit input and the upper 16 bits $KL_{i1}$ of the extended key are input to the AND gate 1a. The bit string of the lower 16 bits of the 32-bit input and the output of the AND gate 1a are input to an XOR gate 3a. The output of the XOR gate 3a and the lower 16 bits $KL_{i2}$ of the extended key are input to the OR gate 2a. The bit string of the upper 16 bits of the 32-bit input and the output of the OR gate 2a are input to an XOR gate 3b. The output of the XOR gate 3b corresponds to the upper 16 bits of a 32-bit output of the FL function, and the output of the XOR gate 3a corresponds to the lower 16 bits of the 32-bit output of the FL function.

In the $FL^{-1}$ function, the bit string of the lower 16 bits of the 32-bit input and the lower 16 bits $KL_{i2}$ of the extended key are input to the OR gate 2b. The bit string of the upper 16 bits of the 32-bit input and the output of the OR gate 2b are input to an XOR gate 3c. The output of the XOR gate 3c and the upper 16 bits $KL_{i1}$ of the extended key are input to the AND gate 1b. The bit string of the lower 16 bits of the 32-bit input and the output of the AND gate 1b are input to an XOR gate 3d. The output of the XOR gate 3c corresponds to the upper 16 bits of a 32-bit output of the $FL^{-1}$ function, and the output of the XOR gate 3d corresponds to the lower 16 bits of the 32-bit output of the $FL^{-1}$ function.

A method for implementing an FL function and an $FL^{-1}$ function in a first typical example will now be described.

Figure 12:
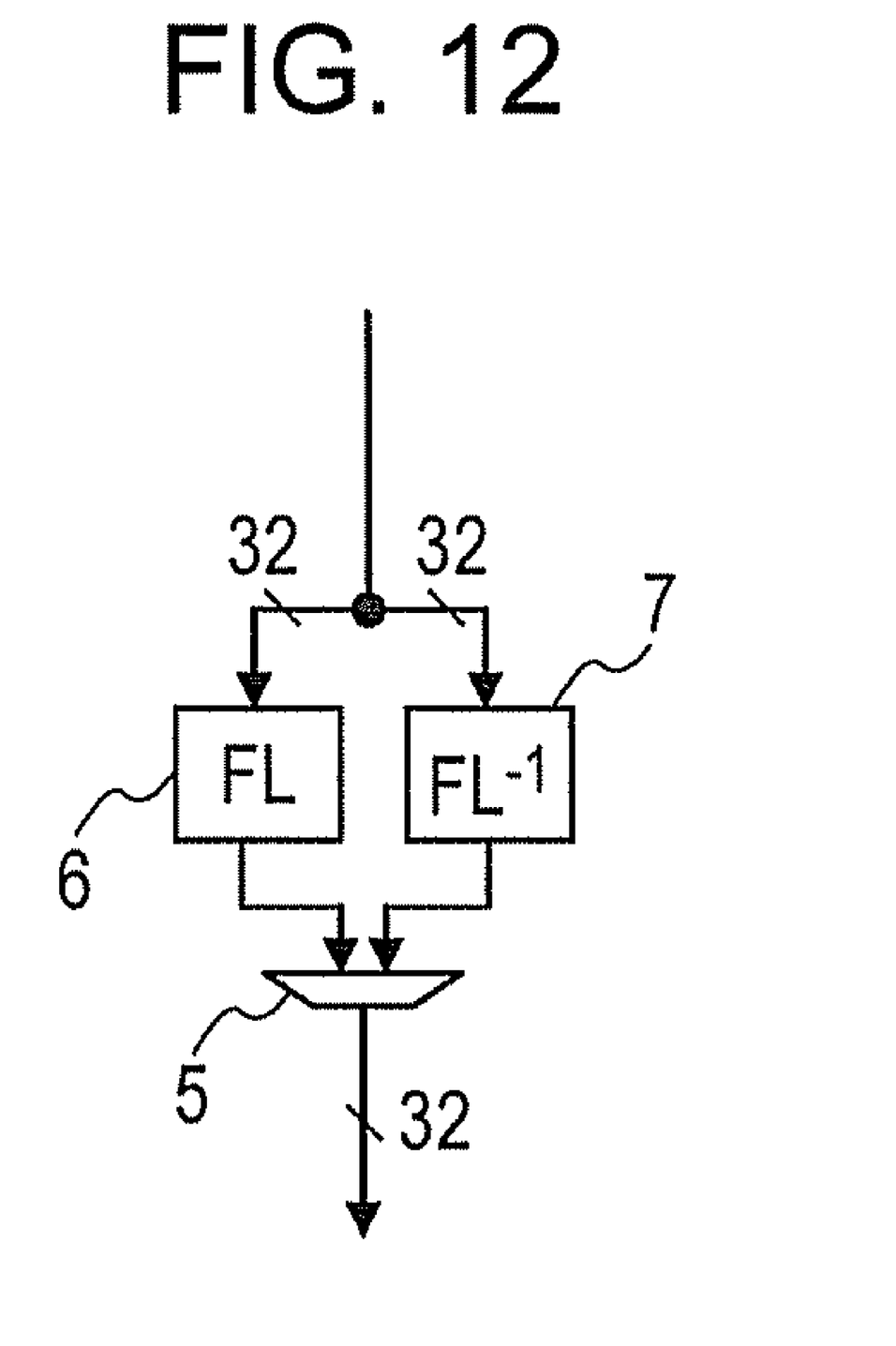
FIG. 12 is a circuit diagram illustrating an implementation method in a first typical example.

In a hardware implementation supporting both the encryption process and the decryption process, it is necessary to implement an FL function and an FL⁻¹ function. FIG. 12 is a circuit diagram illustrating an implementation method in the first typical example. In the first typical example, an FL function 6 and an FL⁻¹ function 7 can be switched using a selector 5 depending on the encryption process or the decryption process.

A method for implementing an FL function and an FL⁻¹ function in a second typical example will now be described.

Figure 13:
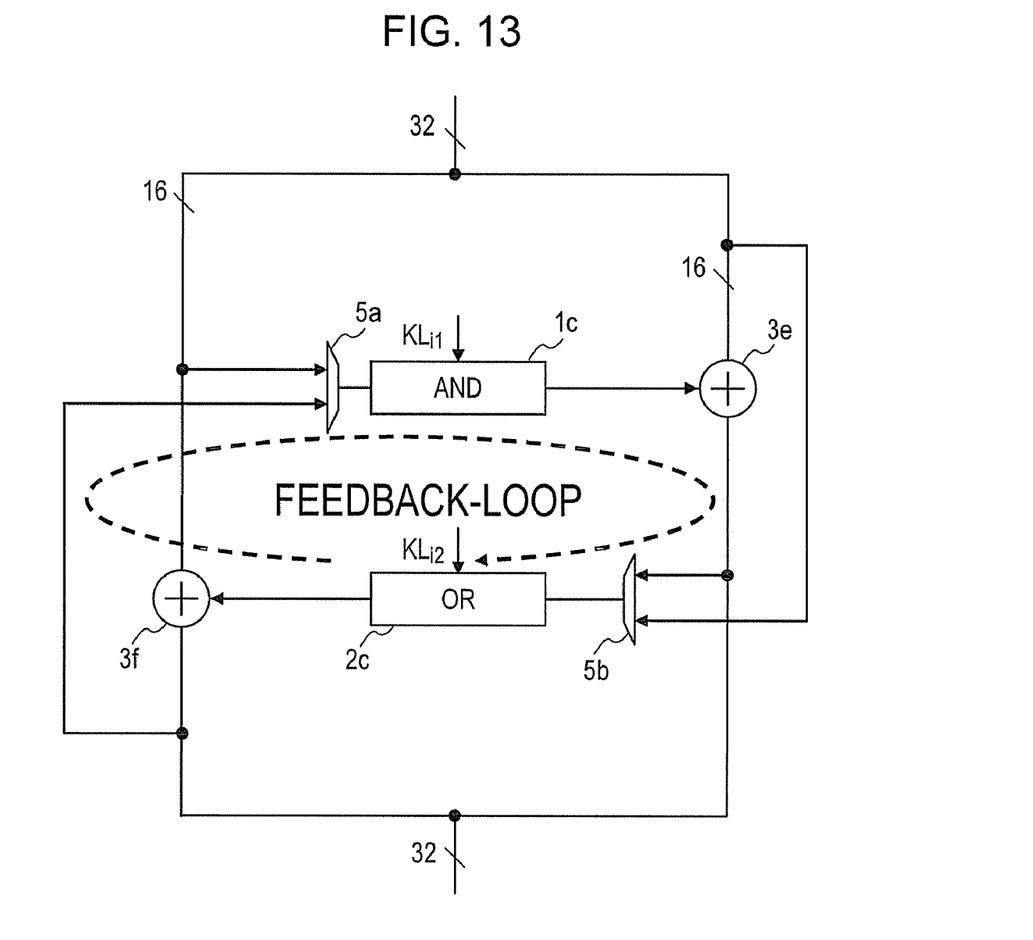
FIG. 13 is a circuit diagram illustrating an implementation method in a second typical example.

A compact implementation method for implementing an FL function and an FL⁻¹ function has been available. Such an implementation method is described in, for example, Japanese Patent No. 4128395. FIG. 13 is a circuit diagram illustrating an implementation method in the second typical example. In the second typical example, a single AND gate 1c and a single OR gate 2c are used for implementation. In the second typical example, therefore, an AND gate and an OR gate, which are common parts between the two functions, are shared and the functions are merged into a single function.

In FIG. 13, the bit string of the lower 16 bits of a 32-bit input and the output of the AND gate 1c are input to an XOR gate 3e. The bit string of the upper 16 bits of the 32-bit input and the output of the OR gate 2c are input to an XOR gate 3f. The bit string of the upper 16 bits of the 32-bit input and the output of the XOR gate 3f are input to a selector 5a. The bit string of the lower 16 bits of the 32-bit input and the output of the XOR gate 3e are input to a selector 5b. The output of the selector 5a and the upper 16 bits $KL_{i1}$ of an extended key are input to the AND gate 1c. The output of the selector 5b and the lower 16 bits $KL_{i2}$ of the extended key are input to the OR gate 2c. The output of the XOR gate 3f corresponds to the upper 16 bits of a 32-bit output of the circuit illustrated in FIG. 13, and the output of the XOR gate 3e corresponds to the lower 16 bits of the 32-bit output of the circuit illustrated in FIG. 13.

When each of the selectors 5a and 5b selects the upper signal, the circuit illustrated in FIG. 13 serves as an FL function. When the lower signals are selected, the circuit serves as an FL⁻¹ function. This technique allows a significant reduction in circuit size. A related technique is disclosed in Dai Yamamoto, et al., "A Very Compact Hardware Implementation of the MISTY1 Block Cipher", CHES 2008, LNCS 5154, pp. 315-330, 2008, or Akashi Satoh and Sumio Morioka, "Small and High-Speed Hardware Architectures for the 3GPP Standard Cipher KASUMI", Information Security Conference 2002, LNCS 2433, pp. 48-62, 2002.

SUMMARY

According to an aspect of the present invention, there is provided a cryptographic processing apparatus and method for performing arithmetic operation on an FL function and an FL⁻¹ function in a cryptographic process. The cryptographic processing apparatus includes a first arithmetic gate configured to receive a first input bit string and a first extended key bit string, the first input bit string being an upper N-bit string in a 2N-bit input of the cryptographic processing apparatus, where the first extended key bit string is based on one of an upper N-bit string and a lower N-bit string of an extended key, the first arithmetic gate is one of an AND gate and an OR gate.

According to an embodiment, a cryptographic processing apparatus includes a first XOR gate configured to receive an output of the first arithmetic gate and a second input bit string, the second input bit string being a lower N-bit string in the 2N-bit input of the cryptographic processing apparatus; a second arithmetic gate configured to receive an output of the first XOR gate and a second extended key bit string, the second extended key bit string being based on the other of the upper N-bit string and the lower N-bit string of the extended key, the second arithmetic gate being a gate different from the first arithmetic gate and the other of the AND gate and the OR gate; a second XOR gate configured to receive an output of the second arithmetic gate and the first input bit string; a third arithmetic gate configured to receive an output of the second XOR gate and the first extended key bit string, the third arithmetic gate being a same gate as the first arithmetic gate and the one of the AND gate and the OR gate; and a third XOR gate configured to receive an output of the third arithmetic gate and an output of the first XOR gate.

Additional objects and advantages of the invention will be set forth in part in the description which follows, and in part will be obvious from the description, or may be learned by practice of the invention. The object and advantageous of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION OF EMBODIMENTS

Reference will now be made in detail to the embodiments, examples of which are illustrated in the accompanying drawings, wherein like reference numerals refer to the like elements throughout. The embodiments are described below to explain the present invention by referring to the figures.

However, the second typical example has a serious problem in that a feedback loop is formed in a combinational circuit. Regardless of which function the circuit illustrated in FIG. 13 serves as, no registers are included in a path and a loop structure is formed only in a combinational circuit. In this structure, it is difficult to perform logic synthesis which is an operation for conversion from a hardware description language into a circuit structure. Even if it is possible to perform logic synthesis, there is a risk that a circuit generated after the conversion may be an oscillator circuit. Therefore, in terms of reliability, it is difficult to commercialize a circuit having the feedback loop structure described above into a product.

Thus, when the features of the FL function and the $FL^{-1}$ function are merged to produce a single function, it is not easy to achieve a reduction in circuit size without forming a feedback loop in a circuit configuration. Conventionally, therefore, in many developments pertaining to MISTY1 and KASUMI, as in the first typical example, the FL function and the $FL^{-1}$ function are independently implemented.

The present technique has been carried out in order to overcome the problems or difficulties described above and others existing in typical systems, and provides a cryptographic processing apparatus for realizing a merge function including an FL function and an $FL^{-1}$ function using a circuit having no feedback loop.

An embodiment of the present technique will be described hereinafter with reference to the drawings.

The present technique provides a compact hardware implementation in common key cryptosystems that employ an FL function and an $FL^{-1}$ function, such as MISTY1, MISTY2, KASUMI, and CAMELLIA, by using a new function obtained by efficiently merging the FL function and the $FL^{-1}$ function into a single function. The present technique is useful for producing compact common key cipher hardware.

In the following, a merge function obtained by merging an FL function and an $FL^{-1}$ function into a single function will be described in the context of MISTY1 by way of example. The basic concept of application to MISTY2, KASUMI, CAMELLIA, and the like is similar to that for MISTY1. While particular applications are discussed herein, the present invention is not limited to implementation with any specific methodology, technique or specific algorithm related to cryptography.

Figure 1:
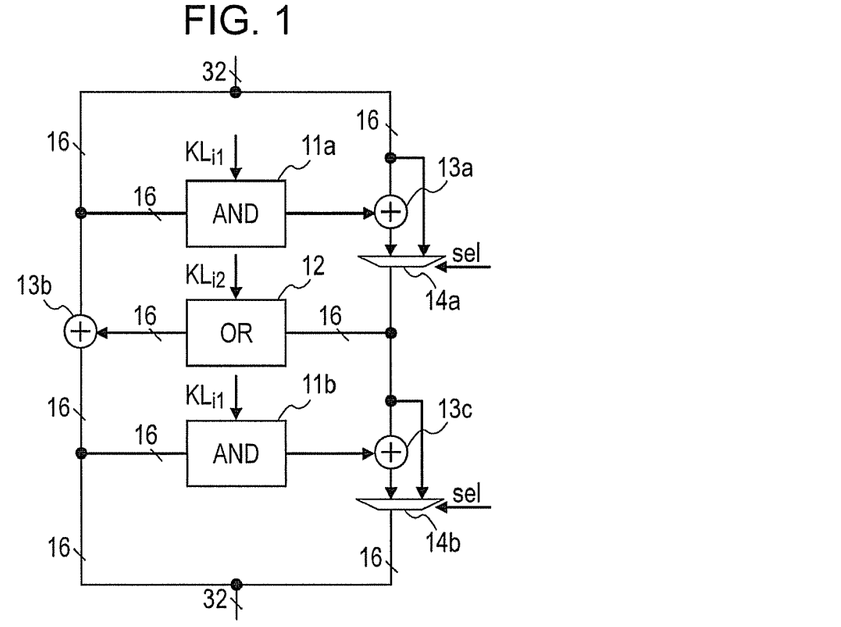
FIG. 1 is a circuit diagram illustrating an example configuration of a merge function according to a first example.

FIG. 1 is a circuit diagram illustrating an example configuration of a merge function according to a first example. As described above, an FL function is configured using a circuit having a two-stage structure in which an AND gate is provided in the first stage and an OR gate is provided in the second stage. Conversely, an $FL^{-1}$ function is configured using a function having a two-stage structure in which an OR gate is provided in the first stage and an AND gate is provided in the second stage. In contrast, the merge function according to the first example is configured using a circuit having a three-stage structure. More specifically, the merge function according to the first example is configured using a circuit including a first arithmetic gate corresponding to an AND gate 11a in the first stage, a second arithmetic gate corresponding to an OR gate 12 in the second stage, and a third arithmetic gate corresponding to an AND gate 11b in the third stage. In the circuit illustrated in FIG. 1, only the OR gate 12 is common to the two functions.

A 32-bit input of the circuit illustrated in FIG. 1 is divided into a first input bit string corresponding to the input upper bit string of the upper 16 bits and a second input bit string corresponding to the input lower bit string of the lower 16 bits. Here, N=16.

In the circuit illustrated in FIG. 1, the input upper bit string and a first extended key bit string $KL_{i1}$ corresponding to the upper 16 bits of an extended key are input to the AND gate 11a. The input lower bit string and the output of the AND gate 11a are input to a first XOR gate corresponding to an XOR gate 13a. The output of the XOR gate 13a and the input lower bit string are input to a first selector corresponding to a selector 14a.

In the circuit illustrated in FIG. 1, the output of the selector 14a and a second extended key bit string $KL_{i2}$ corresponding to the lower 16 bits of the extended key are input to the OR gate 12. The input upper bit string and the output of the OR gate 12 are input to a second XOR gate corresponding to an XOR gate 13b.

In the circuit illustrated in FIG. 1, the output of the XOR gate 13b and $KL_{i1}$ are input to the AND gate 11b. The output of the selector 14a and the output of the AND gate 11b are input to a third XOR gate corresponding to an XOR gate 13c. The output of the XOR gate 13c and the output of the selector 14a are input to a second selector corresponding to a selector 14b.

The output of the XOR gate 13b corresponds to the upper 16 bits of a 32-bit output of the circuit illustrated in FIG. 1. The output of the selector 14b corresponds to the lower 16 bits of the 32-bit output of the circuit.

In the circuit illustrated in FIG. 1, each of the selectors 14a and 14b selects and outputs one of the two inputs in accordance with a selection signal sel. Upon receipt of a selection signal corresponding to the FL function, the selector 14a selects the output of the XOR gate 13a, and the selector 14b selects the output of the selector 14a. Accordingly, the circuit illustrated in FIG. 1 serves as an FL function. Upon receipt of a selection signal corresponding to the $FL^{-1}$ function, the selector 14a selects the input lower bit string, and the selector 14b selects the output of the XOR gate 13c. Accordingly, the circuit illustrated in FIG. 1 serves as an $FL^{-1}$ function.

Thus, only the OR gate 12, rather than both an AND gate and an OR gate, is used as a common part, thereby avoiding the formation of a feedback loop.

In the circuit illustrated in FIG. 1, furthermore, the FL function and the $FL^{-1}$ function are merged into a single function, leading to saving of and thereby the circuit size corresponding to a 16-bit AND gate and a 16-bit XOR gate, that is, 56 gates, can be removed. Therefore, the first typical example requires a circuit size of about 336 gates for 0.18-micrometer process while the first example requires a circuit size of about 280 gates.

In order to further reduce the circuit size in the first example, the selectors in the first example are equivalently transformed into AND gates.

Figure 2:
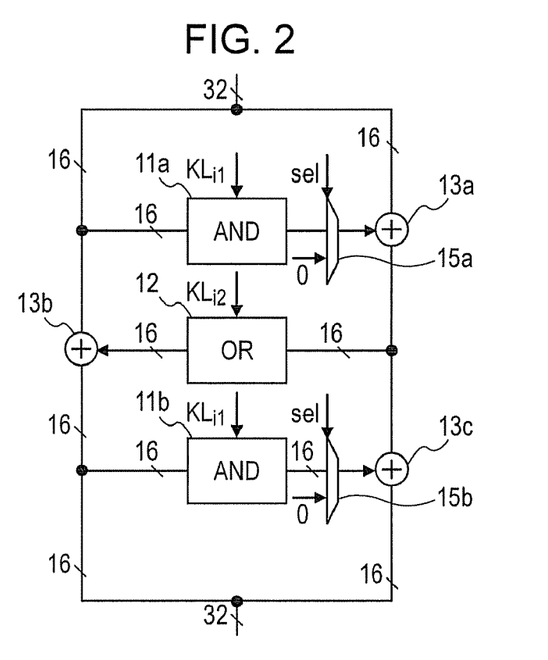
FIG. 2 is a circuit diagram illustrating an example configuration of a merge function according to a second example.

FIG. 2 is a circuit diagram illustrating an example configuration of a merge function according to a second example. In FIG. 2, the same reference numerals as those in FIG. 1 represent the same portions as or equivalent portions to those illustrated in FIG. 1, and will not be described here. In the circuit illustrated in FIG. 2, the selectors 14a and 14b in the circuit illustrated in FIG. 1 are moved to the input side of the XOR gates 13a and 13c to obtain a third selector corresponding to a selector 15a and a fourth selector corresponding to a selector 15b, respectively. Therefore, the selectors 15a and 15b can select the output signals of the AND gates 11a and 11b, respectively, or 0 signal of 16 bits.

In the circuit illustrated in FIG. 2, upon receipt of a selection signal corresponding to the FL function, the selector 15a selects the output of the AND gate 11a, and the selector 15b selects the 0 signal. Accordingly, the circuit illustrated in FIG. 2 serves as an FL function. In the circuit illustrated in FIG. 2, upon receipt of a selection signal corresponding to the $FL^{-1}$ function, the selector 15a selects the 0 signal, and the selector 15b selects the output of the AND gate 11b. Accordingly, the circuit illustrated in FIG. 2 serves as an $FL^{-1}$ function.

Figure 3:
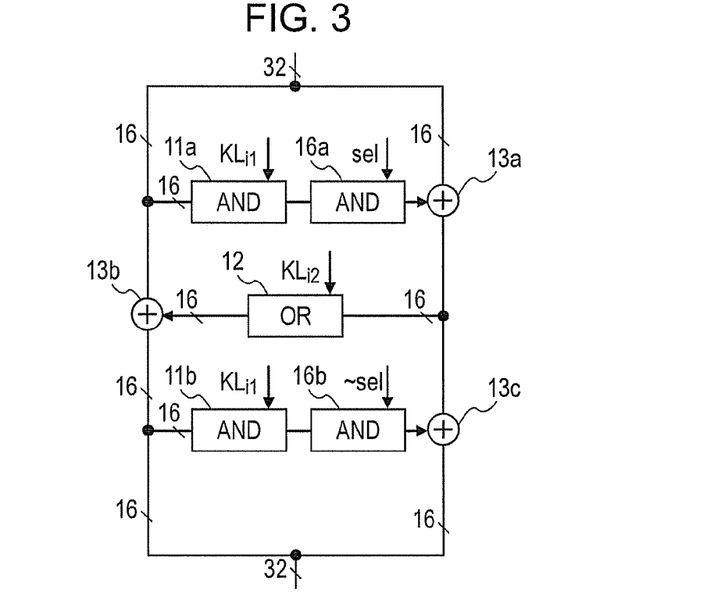
FIG. 3 is a circuit diagram illustrating an example configuration of a merge function according to a third example.

FIG. 3 is a circuit diagram illustrating an example configuration of a merge function according to a third example. In FIG. 3, the same reference numerals as those in FIG. 2 represent the same portions as or equivalent portions to those illustrated in FIG. 2, and will not be described here. In the circuit illustrated in FIG. 3, the selectors 15a and 15b in the circuit illustrated in FIG. 2 are equivalently transformed into a first AND gate corresponding to an AND gate 16a and a second AND gate corresponding to an AND gate 16b, respectively. In the circuit illustrated in FIG. 2, the selection signals sel for the selectors are 1-bit signals, whereas in the circuit illustrated in FIG. 3, selection signals sel are 16-bit expanded signals.

In the circuit illustrated in FIG. 3, the AND gate 16a performs an AND operation between the output of the AND gate 11a and the selection signal sel. The AND gate 16b performs an AND operation between the output of the AND gate 11b and the negation of the selection signal sel.

Thus, the transformation of selectors into AND gates allows the circuit illustrated in FIG. 3 to further reduce the circuit size as compared with the circuit illustrated in FIG. 1.

The merging of the FL function and the $FL^{-1}$ function into a single function may cause an extension of the critical path, leading to a reduction in processing speed.

It is assumed here that a 2-1 NAND gate has a delay d. When an AND gate, an OR gate, an XOR gate, and a selector are configured using only NAND gates, the delays of the individual gates are 2d, 2d, 3d, and 3d, respectively.

The delay of the critical path in the first typical example illustrated in FIG. 12 is given by the sum of the delay of FL or $FL^{-1}$ and the delay of the selector that selects FL or $FL^{-1}$. Here, the delay of FL or $FL^{-1}$ is given by (first stage: AND-XOR)+(second stage: OR-XOR) for FL or (first stage: OR-XOR)+(second stage: AND-XOR) for $FL^{-1}$. Therefore, the delay of FL or $FL^{-1}$ is given by (2d+3d)+(2d+3d)=10d. Further, the delay of the selector that selects FL or $FL^{-1}$ is 3d. Therefore, the critical path in the first typical example has a delay of 13d.

In contrast, the delay of the critical path in the third example illustrated in FIG. 2 is given by (first stage: AND-sel-XOR)+(second stage: OR-XOR)+(third stage: AND-sel-XOR)=(2d+3d+3d)+(2d+3d)+(2d+3d+3d)=21d. This is because while the FL function and the $FL^{-1}$ function are in parallel in the first typical example illustrated in FIG. 12, the FL function and the $FL^{-1}$ function are in tandem in the third example illustrated in FIG. 3. In the following, in order to overcome the inconvenience described above, the AND gates equivalently transformed in the third example are removed from the critical path.

Figure 4:
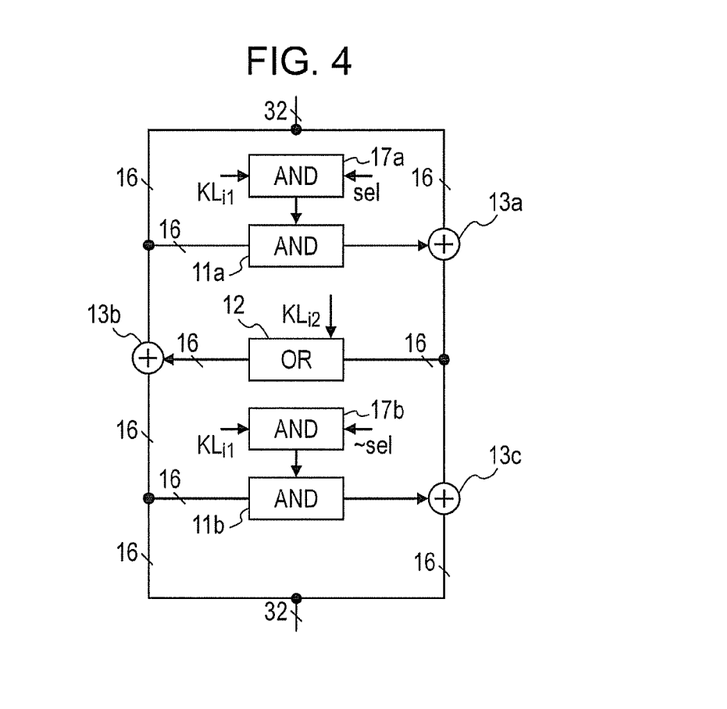
FIG. 4 is a circuit diagram illustrating an example configuration of a merge function according to a fourth example.

FIG. 4 is a circuit diagram illustrating an example configuration of a merge function according to a fourth example. In FIG. 4, the same reference numerals as those in FIG. 3 represent the same portions as or equivalent portions to those illustrated in FIG. 3, and will not be described here. In the circuit illustrated in FIG. 4, the AND gates 16a and 16b in the circuit illustrated in FIG. 3 are removed from the critical path and are replaced by a third AND gate corresponding to an AND gate 17a and a fourth AND gate corresponding to an AND gate 17b, respectively.

In the circuit illustrated in FIG. 4, the AND gate 17a performs an AND operation between a selection signal sel and $KL_{i1}$. The AND gate 17b performs an AND operation between the negation of the selection signal sel and $KL_{i1}$.

In MISTY1, a path for generating an extended key $KL_{ij}$ is not a critical path. This is because there are a large number of known implementations capable of generating $KL_{ij}$ in a cycle preceding the processing cycle of the FL function. The application of those implementations to MISTY1 can prevent the effect of the delay time for generating the extended key $KL_{ij}$ on the delay time of the FL function. With the consideration of the nature of MISTY1, the AND gates 16a and 16b illustrated in FIG. 3 can be moved to the positions of the AND gates 17a and 17b illustrated in FIG. 4. Therefore, the delay of the critical path in the circuit illustrated in FIG. 4 can be reduced by an amount corresponding to two AND gates, as compared with that in the circuit illustrated in FIG. 3. That is, the delay of the critical path in the circuit illustrated in FIG. 4 is given by (first stage: AND-XOR)+(second stage: OR-XOR)+(third stage: AND-XOR)=(2d+3d)+(2d+3d)+(2d+3d)=15d.

Figure 5:
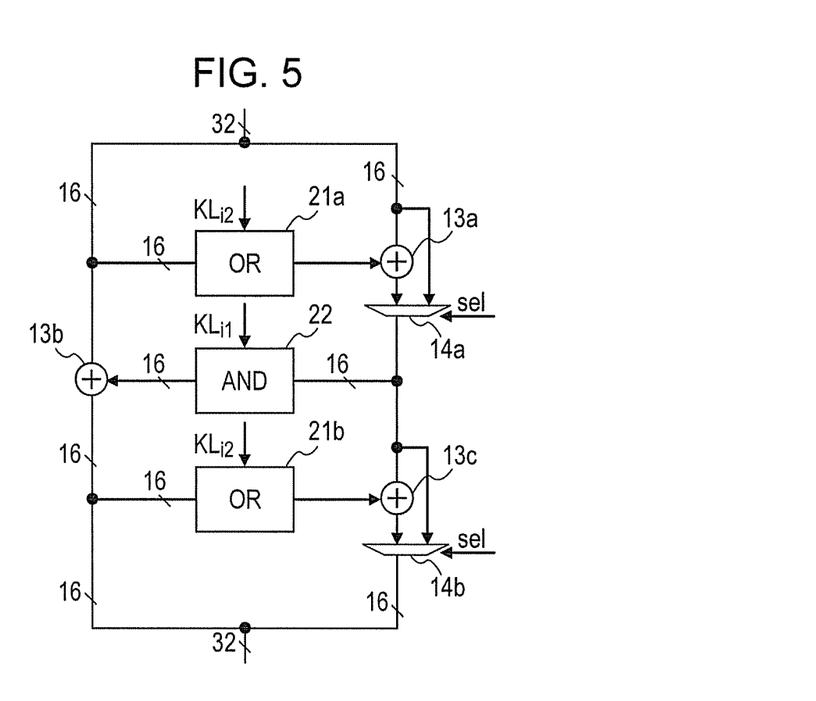
FIG. 5 is a circuit diagram illustrating an example configuration of a merge function according to a fifth example.

FIG. 5 is a circuit diagram illustrating an example configuration of a merge function according to a fifth example. In FIG. 5, the same reference numerals as those in FIG. 1 represent the same portions as or equivalent portions to those illustrated in FIG. 1, and will not be described here. The fifth example has a basic configuration and advantages similar to those in the first example illustrated in FIG. 1, but is different in the arrangement of OR gates and an AND gate. In the circuit illustrated in FIG. 1, an OR gate is common to the FL function and the $FL^{-1}$ function, whereas in the circuit illustrated in FIG. 5, an AND gate is common to the FL function and the $FL^{-1}$ function. More specifically, the circuit illustrated in FIG. 5 is configured using a circuit including a first arithmetic gate corresponding to an OR gate 21a in the first stage, a second arithmetic gate corresponding to an AND gate 22 in the second stage, and a third arithmetic gate corresponding to an OR gate 21b in the third stage. In the circuit illustrated in FIG. 5, only the AND gate 22 is common to the two functions.

In the circuit illustrated in FIG. 5, the output of the OR gate 21a is connected to the input of the XOR gate 13a. The output of the AND gate 22 is connected to the input of the XOR gate 13b. The output of the OR gate 21b is connected to the input of the XOR gate 13c. In the fifth example and the following sixth and seventh examples, a first extended key bit string corresponds to the input of an OR gate based on $KL_{i2}$, and a second extended key bit string corresponds to the input of an AND gate based on $KL_{i1}$.

Figure 6:
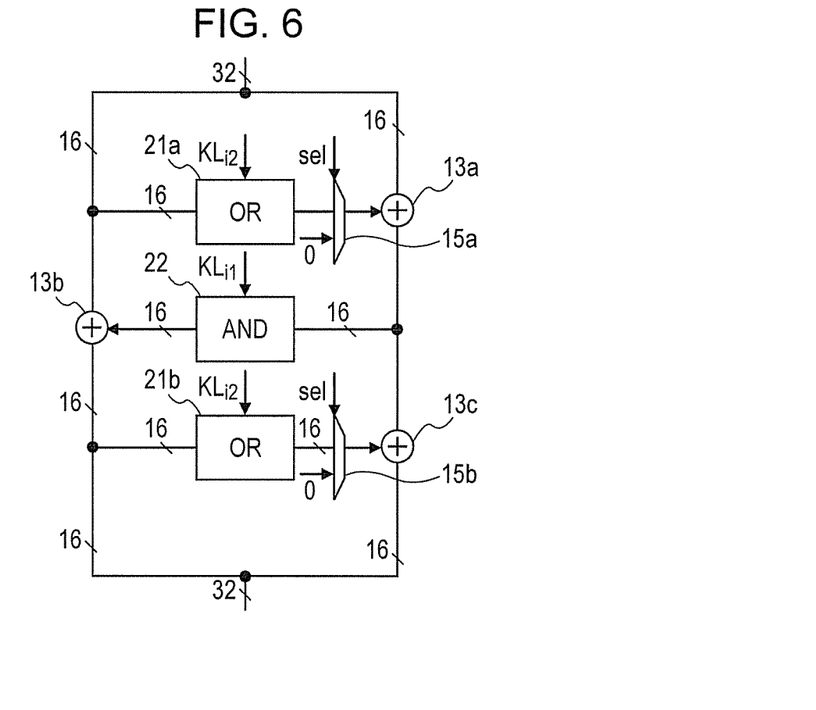
FIG. 6 is a circuit diagram illustrating an example configuration of a merge function according to a sixth example.

FIG. 6 is a circuit diagram illustrating an example configuration of a merge function according to the sixth example. In FIG. 6, the same reference numerals as those in FIG. 5 represent the same portions as or equivalent portions to those illustrated in FIG. 5, and will not be described here. In the circuit illustrated in FIG. 6, the selectors 14a and 14b in the circuit illustrated in FIG. 5 are moved to the input side of the XOR gates 13a and 13c to obtain selectors 15a and 15b, respectively. The sixth example has a basic configuration and advantages similar to those of the second example, but is different in the arrangement of OR gates and an AND gate.

Figure 7:
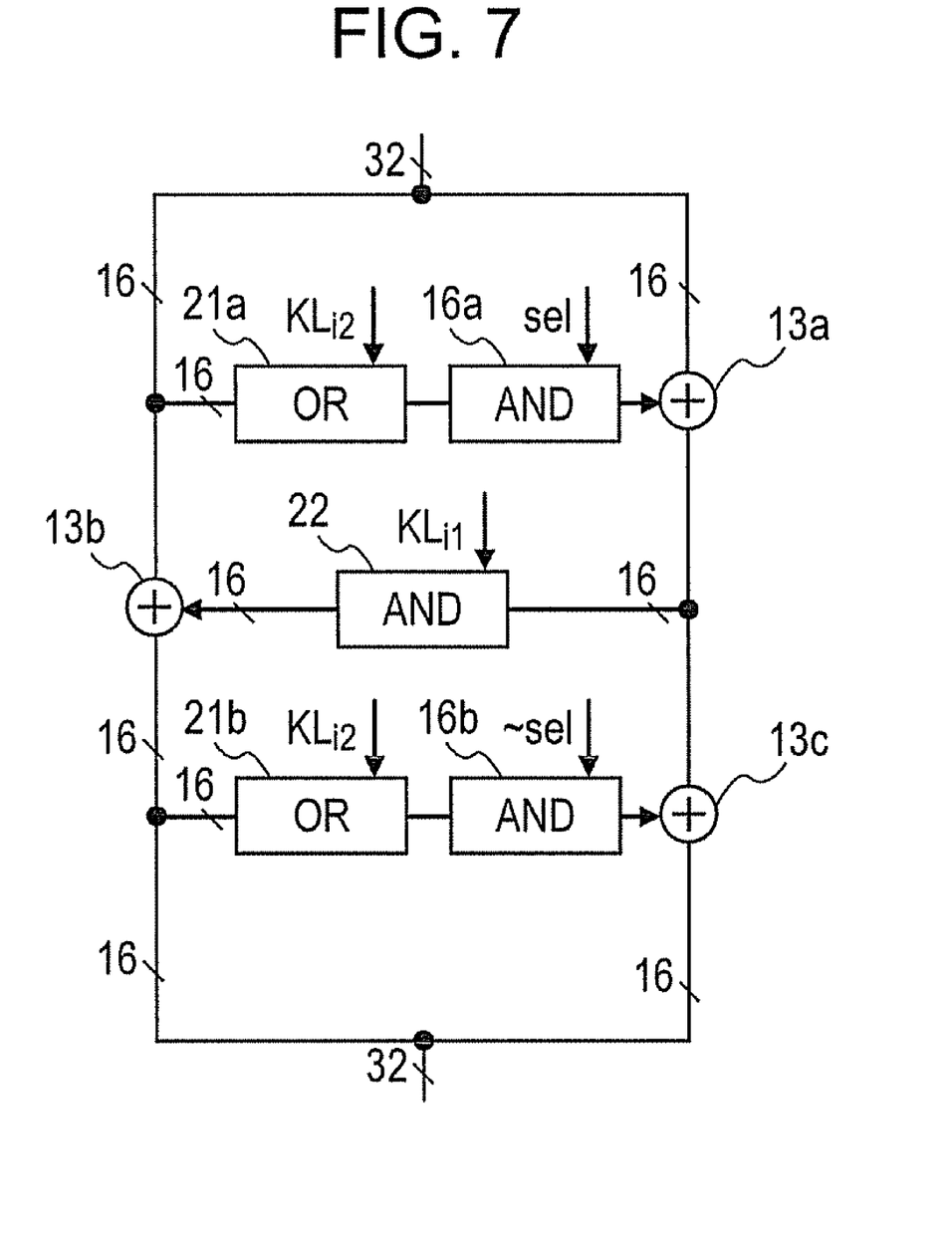
FIG. 7 is a circuit diagram illustrating an example configuration of a merge function according to a seventh example.

FIG. 7 is a circuit diagram illustrating an example configuration of a merge function according to the seventh example. In FIG. 7, the same reference numerals as those in FIG. 6 represent the same portions as or equivalent portions to those illustrated in FIG. 6, and will not be described here. In the circuit illustrated in FIG. 7, the selectors 15a and 15b in the circuit illustrated in FIG. 6 are equivalently transformed into AND gates 16a and 16b, respectively. The seventh example has a basic configuration and advantages similar to those in the third example, but is different in the arrangement of OR gates and an AND gate.

As least some of the advantages of the examples described above are described below in detail.

Figure 8:
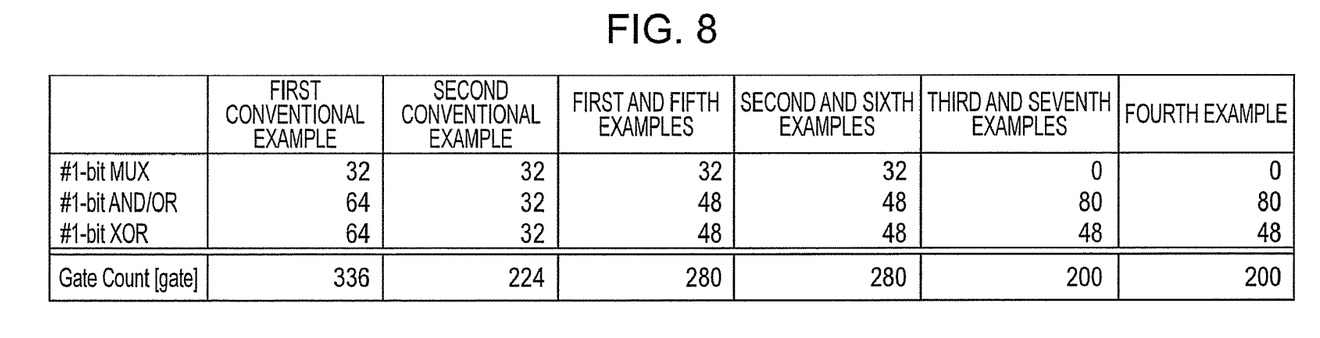
FIG. 8 is a table illustrating exemplary circuit sizes according to embodiment(s).

FIG. 8 is a table illustrating exemplary circuit sizes of the circuits according to the respective examples. The table illustrated in FIG. 8 provides exemplary circuit sizes in the first to seventh examples and the first and second typical examples. In the table illustrated in FIG. 8, #1-bit MUX represents the number of selectors having a width of 1 bit. #1-bit AND/OR represents the number of AND gates and OR gates having a width of 1 bit. #1-bit XOR represents the number of XOR gates having a width of 1 bit. Gate Count represents the circuit size concerning the FL function and the $FL^{-1}$ function. In the first typical example, the circuit size is as large as 336 gates. This is because the FL function and the $FL^{-1}$ function are independently provided, and a selector for switching between the functions is also required. The second typical example allows a small circuit size; however, due to the use of the feedback loop structure, the implementation cannot be commercialized into a product. The first and second examples allow a reduction in circuit size as compared with the first typical example, but have small advantages. This is because the circuit sizes of the selectors are the same. The third and fourth examples allow a reduction in circuit size up to 200 gates by equivalently transforming the selectors in the first example into AND gates.

Accordingly, it can be expected that, when the first typical example and the fourth example are compared, the circuit size concerning the FL function and the $FL^{-1}$ function is reduced from 336 gates to 200 gates, that is, by about 40%.

The overall circuit size of a typical compact MISTY1 hardware implementation is about 4000 gates for 0.18-micrometer process according to Yamamoto et al. in the paper mentioned above. The application of the fourth example to this typical technique allows a reduction in circuit size by about 3.5%.

Further, the overall circuit size of a typical compact KASUMI hardware implementation is about 3400 gates for 0.13-micrometer process according to Satoh and Morioka in the paper mentioned above. The application of the fourth example to this typical technique allows a reduction in circuit size by up to 4%.

Figure 9:
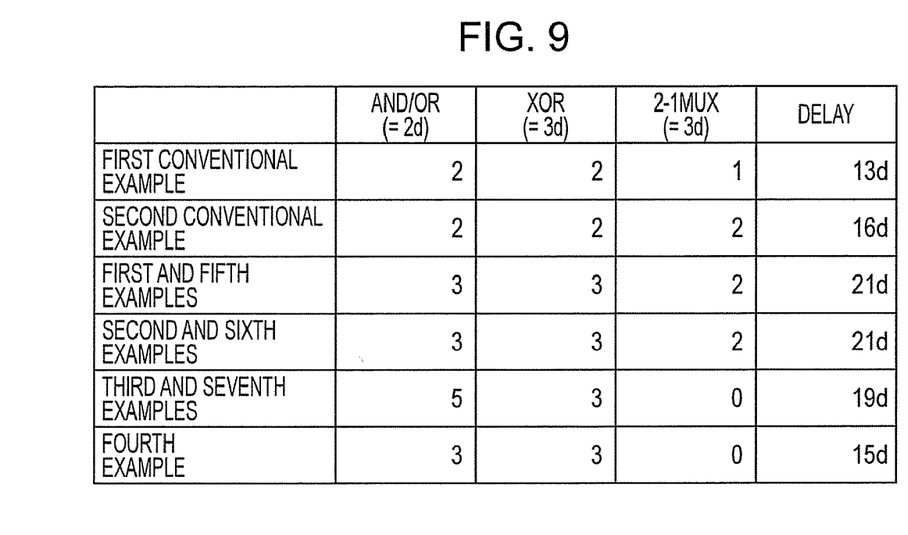
FIG. 9 is a table illustrating exemplary delay times according to embodiment(s).

FIG. 9 is a table illustrating exemplary delay times in the respective examples. The table illustrated in FIG. 9 provides exemplary delay times in the first to seventh examples and the first and second typical examples. In the table illustrated in FIG. 9, AND/OR represents the number of AND gates and OR gates in the merge function. XOR represents a number of XOR gates in a merge function. 2-1MUX represents the number of selectors in the merge function. Delay represents the delay time of the merge function. In the first typical example, the delay time is 13d. In the first example, in contrast, the delay time is larger and is 21d. This is because, as described previously, the merge function has a three-stage structure, and additional selectors are generated within the merge function. In the third example, the equivalent transformation of the selectors into AND gates allows a reduction in delay time by 2d but the delay time is still larger than that in the first typical example. In the fourth example, the removal of the two AND gates from the critical path results in a delay time of 15d. Therefore, the delay time in the fourth example is substantially equivalent to that in the first typical example, i.e., 13d.

According to the first or fifth example, one of an AND gate and an OR gate, rather than both an AND gate and an OR gate, is used as a common module to merge the functions, thereby avoiding the formation of a feedback loop.

According to the second, third, fourth, sixth, or seventh example, the selectors, which may cause the increase in circuit size and the extension of the critical path, are equivalently transformed into AND gates, thereby reducing the circuit size. Further, the AND gates are removed from the critical path, thereby reducing the critical path. While the configurations and structures of the embodiment(s) herein are described using specific examples, the present invention is not limited to particulars of any of the examples.

The embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on computer-readable media comprising computer-readable recording media. The program/software implementing the embodiments may also be transmitted over transmission communication media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. An example of communication media includes a carrier-wave signal.

Further, according to an aspect of the embodiments, any combinations of the described features, functions and/or operations can be provided.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention, the scope of which is defined in the claims and their equivalents.

What is claimed is:

1. A cryptographic processing apparatus for performing arithmetic operation on an FL function and an $FL^{-1}$ function in a cryptographic process, comprising:

a first arithmetic gate configured to receive a first input bit string and a first extended key bit string, the first input bit string being an upper N-bit string in a 2N-bit input of the cryptographic processing apparatus, the first extended key bit string being based on one of an upper N-bit string and a lower N-bit string of an extended key, the first arithmetic gate being one of an AND gate and an OR gate;

a first XOR gate configured to receive an output of the first arithmetic gate and a second input bit string, the second input bit string being a lower N-bit string in the 2N-bit input of the cryptographic processing apparatus;

a second arithmetic gate configured to receive an output of the first XOR gate and a second extended key bit string, the second extended key bit string being based on the other of the upper N-bit string and the lower N-bit string of the extended key, the second arithmetic gate being a gate different from the first arithmetic gate and the other of the AND gate and the OR gate;
a second XOR gate configured to receive an output of the second arithmetic gate and the first input bit string;
a third arithmetic gate configured to receive an output of the second XOR gate and the first extended key bit string, the third arithmetic gate being a same gate as the first arithmetic gate and the one of the AND gate and the OR gate; and
a third XOR gate configured to receive an output of the third arithmetic gate and an output of the first XOR gate.

2. The cryptographic processing apparatus according to claim 1, further comprising:
a first selector configured to select one of the output of the first XOR gate and the second input bit string based on a selection signal received, and to output the selected one to the second arithmetic gate and the third XOR gate; and
a second selector configured to select one of an output of the third XOR gate based on the selection signal, and an output of the first selector and to output the selected one.

3. The cryptographic processing apparatus according to claim 2, wherein the first selector is configured to select the output of the first XOR gate according to a selection signal corresponding to the FL function and to select the second input bit string according to a selection signal corresponding to the $FL^{-1}$ function, and
wherein the second selector configured to select the output of the first selector according to the selection signal corresponding to the FL function and to select the output of the third XOR gate according to the selection signal corresponding to the $FL^{-1}$ function.

4. The cryptographic processing apparatus according to claim 1, further comprising:
a third selector configured to select one of the output of the first arithmetic gate and a zero signal of N bits based on a selection signal received, and to output the selected one to the first XOR gate; and
a fourth selector configured to select one of the output of the third arithmetic gate and a zero signal of N bits based on the selection signal, and to output the selected one to the third XOR gate.

5. The cryptographic processing apparatus according to claim 4, wherein the third selector is configured to select the output of the first arithmetic gate according to a selection signal corresponding to the FL function and to select the zero signal of N bits according to a selection signal corresponding to the $FL^{-1}$ function, and
wherein the fourth selector is configured to select the zero signal of N bits according to the selection signal corresponding to the FL function and to select the output of the third arithmetic gate according to the selection signal corresponding to the $FL^{-1}$ function.

6. The cryptographic processing apparatus according to claim 1, further comprising:
a first AND gate configured to perform an AND operation between the output of the first arithmetic gate and the selection signal and to output a result to the first XOR gate; and
a second AND gate configured to perform an AND operation between the output of the third arithmetic gate and a negation of the selection signal and to output a result to the third XOR gate.

7. The cryptographic processing apparatus according to claim 1, further comprising:

a third AND gate configured to perform an AND operation between the upper N-bit string of the extended key and the selection signal and to output a result to the first arithmetic gate; and
a fourth AND gate configured to perform an AND operation between the upper N-bit string of the extended key and a negation of the selection signal and to output a result to the third arithmetic gate,
wherein each of the first arithmetic gate and the third arithmetic gate is an AND gate, and the second arithmetic gate is an OR gate.

8. The cryptographic processing apparatus according to claim 1, wherein each of the first arithmetic gate and the third arithmetic gate is an AND gate, and
the second arithmetic gate is an OR gate.

9. The cryptographic processing apparatus according to claim 1, wherein each of the first arithmetic gate and the third arithmetic gate is an OR gate, and
the second arithmetic gate is an AND gate.

10. The cryptographic processing apparatus according to claim 1, wherein the first arithmetic gate, the first XOR gate, the second arithmetic gate, the second XOR gate, the third arithmetic gate, and the third XOR gate are provided in an FL function and an $FL^{-1}$ function in MISTY1 cipher algorithm of a common key cryptosystem.

11. The cryptographic processing apparatus according to claim 1, wherein the first arithmetic gate, the first XOR gate, the second arithmetic gate, the second XOR gate, the third arithmetic gate, and the third XOR gate are provided in an FL function and an $FL^{-1}$ function in MISTY2 cipher algorithm of a common key cryptosystem.

12. The cryptographic processing apparatus according to claim 1, wherein the first arithmetic gate, the first XOR gate, the second arithmetic gate, the second XOR gate, the third arithmetic gate, and the third XOR gate are provided in an FL function and an $FL^{-1}$ function in KASUMI cipher algorithm of a common key cryptosystem.

13. The cryptographic processing apparatus according to claim 1, wherein the first arithmetic gate, the first XOR gate, the second arithmetic gate, the second XOR gate, the third arithmetic gate, and the third XOR gate are provided in an FL function and an $FL^{-1}$ function in CAMELLIA cipher algorithm of a common key cryptosystem.

14. A cryptographic processing method for performing arithmetic operation on an FL function and an $FL^{-1}$ function in a cryptographic process, comprising:
inputting a first input bit string and a first extended key bit string to a first arithmetic gate, the first input bit string being an upper N-bit string in a 2N-bit input in the cryptographic processing method, the first extended key bit string being based on one of an upper N-bit string and a lower N-bit string of an extended key, the first arithmetic gate being one of an AND gate and an OR gate;
inputting an output of the first arithmetic gate and a second input bit string to a first XOR gate, the second input bit string being a lower N-bit string in the 2N-bit input in the cryptographic processing method;
inputting an output of the first XOR gate and a second extended key bit string to a second arithmetic gate, the second extended key bit string being based on the other of the upper N-bit string and the lower N-bit string of the extended key, the second arithmetic gate being a gate different from the first arithmetic gate and the other of the AND gate and the OR gate;
inputting an output of the second arithmetic gate and the first input bit string to a second XOR gate;

inputting an output of the second XOR gate and the first extended key bit string to a third arithmetic gate, the third arithmetic gate being a same gate as the first arithmetic gate and the one of the AND gate and the OR gate; and inputting an output of the third arithmetic gate and an output of the first XOR gate to a third XOR gate.

15. The cryptographic processing method according to claim 14, further comprising:

inputting the output of the first XOR gate and the second input bit string to a first selector, the first selector being configured to select one of two inputs based on a selection signal received and to output the selected one to the second arithmetic gate and the third XOR gate; and inputting an output of the third XOR gate and an output of the first selector to a second selector, the second selector being configured to select one of two outputs based on the selection signal and to output the selected one.

16. The cryptographic processing method according to claim 15, wherein the first selector selects the output of the first XOR gate according to a selection signal corresponding to the FL function, and selects the second input bit string according to a selection signal corresponding to the $FL^{-1}$ function, and wherein the second selector selects the output of the first selector according to the selection signal corresponding to the FL function, and selects the output of the third XOR gate according to the selection signal corresponding to the $FL^{-1}$ function.

17. The cryptographic processing method according to claim 14, further comprising:

inputting the output of the first arithmetic gate and a zero signal of N bits to a third selector, the third selector being configured to select one of two inputs based on a selection signal received and to output the selected one to the first XOR gate; and inputting the output of the third arithmetic gate and a zero signal of N bits to a fourth selector, the fourth selector being configured to select one of two inputs based on the selection signal and to output the selected one to the third XOR gate.

18. The cryptographic processing method according to claim 17, wherein the third selector selects the output of the first arithmetic gate according to a selection signal corresponding to the FL function, and selects the zero signal of N bits according to a selection signal corresponding to the $FL^{-1}$ function, and wherein the fourth selector selects the zero signal of N bits according to the selection signal corresponding to the FL function, and selects the output of the third arithmetic gate according to the selection signal corresponding to the $FL^{-1}$ function.

* * * * *